//  
United States Patent [19]
Winston et al.

[11] 3,938,623
[45] Feb. 17, 1976

[54] GREASE GUN

[76] Inventors: Richard C. Winston, 139 Rolling Hills Road, Thornwood, N.Y. 10594; Leonard J. Vallender, 11 Clover Road, Valhalla, N.Y. 10595

[22] Filed: Jan. 16, 1975

[21] Appl. No.: 541,626

[52] U.S. Cl. .................. 184/38 R; 184/28; 222/378
[51] Int. Cl.² ...................... F16N 3/12; F16N 13/08
[58] Field of Search ............ 184/38 R, 26, 28, 45 R, 184/45 A, 48 R, 48 A, 74, 75, 8 C; 222/378, 380, 384, 402

[56] References Cited
UNITED STATES PATENTS

| | | | |
|---|---|---|---|
| 1,036,205 | 8/1912 | Faul ................................. | 184/45 R |
| 1,231,442 | 6/1917 | Smith ............................. | 222/402 X |
| 1,646,477 | 10/1927 | Davis et al. ..................... | 222/378 X |
| 1,721,817 | 7/1929 | Goodman ....................... | 184/28 UX |
| 2,094,423 | 9/1937 | Bernhardt ...................... | 222/384 |

FOREIGN PATENTS OR APPLICATIONS

| | | | |
|---|---|---|---|
| 641,517 | 8/1928 | France ............................... | 222/378 |
| 1,219,062 | 5/1960 | France .............................. | 184/38 R |
| 83,023 | 4/1919 | Switzerland ........................... | 184/28 |

*Primary Examiner*—Richard C. Pinkham
*Assistant Examiner*—Arnold W. Kramer

[57] ABSTRACT

A grease gun having a hollow cylindrical body closed at one end and threadedly engaged at the other end with a removable delivery nozzle. Within the cylindrical body there is a central push rod having one end extending through a central aperture in the closed end thereof which is slidably retained to a plunger within the body by means of a locking ring, and a barrel spring around the push rod adapted to be compressed during retraction of the push rod and its associated plunger. The push rod comprises a circumferentially recessed groove between the locking ring and exposed end and an elongated detent portion in spaced relation to the circumferentially recessed groove near the exposed end. The removable delivery nozzle includes a central bore and a check valve therein adapted to be biased by the pressure of the grease in the cylindrical body in order to permit the passage of the grease therefrom into the removable delivery nozzle. A lock slide lever having a central aperture with a laterally reduced extension is slidably secured to the closed end of the cylindrical body, said laterally reduced extension being adapted to engage into the circumferentially reduced groove of the push rod when the push rod is retracted to the reduced groove position, and into the elongated detent portion of said push rod when it is in normal release position to control the stroke of the push rod. The closed end of the cylindrical body is provided with a vent hole for expulsion of entrapped air from the cylindrical body during the retraction of the push rod, and the removable delivery nozzle is provided with an orifice adapted to receive the male grease fitting of the part or apparatus which is being lubricated. A spring may be inserted between the closed end and a handle on the exposed end of the push rod to return the push rod after a power stroke, and a finger grip fastened to the cylinder body for one-handed operation.

2 Claims, 4 Drawing Figures

3,938,623

GREASE GUN

BACKGROUND OF THE INVENTION

1. Field of Invention

This invention relates to grease guns and particularly to hand-operated grease guns. More specifically, the present invention is directed to grease guns which are compact, leakproof, relatively simple in design and construction, and which are particularly well suited for use in the electronic industry.

2. The Prior Art

Hand-operated grease guns have been in common usage for lubricating various automobile parts and accessories. Typically, such hand-operated grease guns are of the type described in U.S. Pat. No. 1,818,539, issued on Aug. 11, 1931 to Peter Gresser, and U.S. Pat. No. 1,932,780, issued on Oct. 31, 1933 to George H. Hartman. However, these grease guns are ordinarily employed for lubricating various automobile parts and accessories, and they are not particularly well suited for use in the electronic industry for lubricating electronic instruments. As it will become apparent from the ensuing description, the grease gun described in the present invention is particularly designed and constructed for use in the electronic industry and thus constitutes an improvement over the prior art grease guns, both in their construction and the manner of their operation.

DESCRIPTION OF INVENTION

The present invention contemplates providing a handoperated grease gun which is uniquely adapted for use in the electronic industry. The grease gun of this invention is compact, relatively small in dimensions, and comprises novel and unique features as will become apparent from the following detailed description taken in conjunction with the accompanying drawings, wherein.

Figure 1:
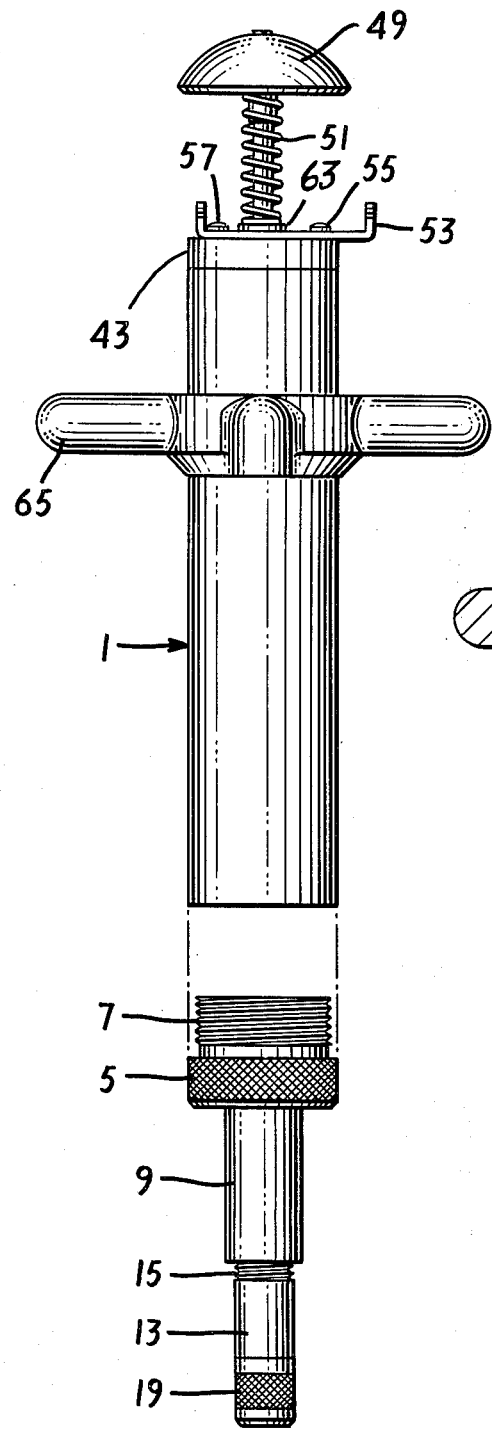
FIG. 1 is a side view of the hand-operated grease gun of this invention, in normal release position, with the removable delivery nozzle broken away for convenience of illustration.
Figures 2, 3:
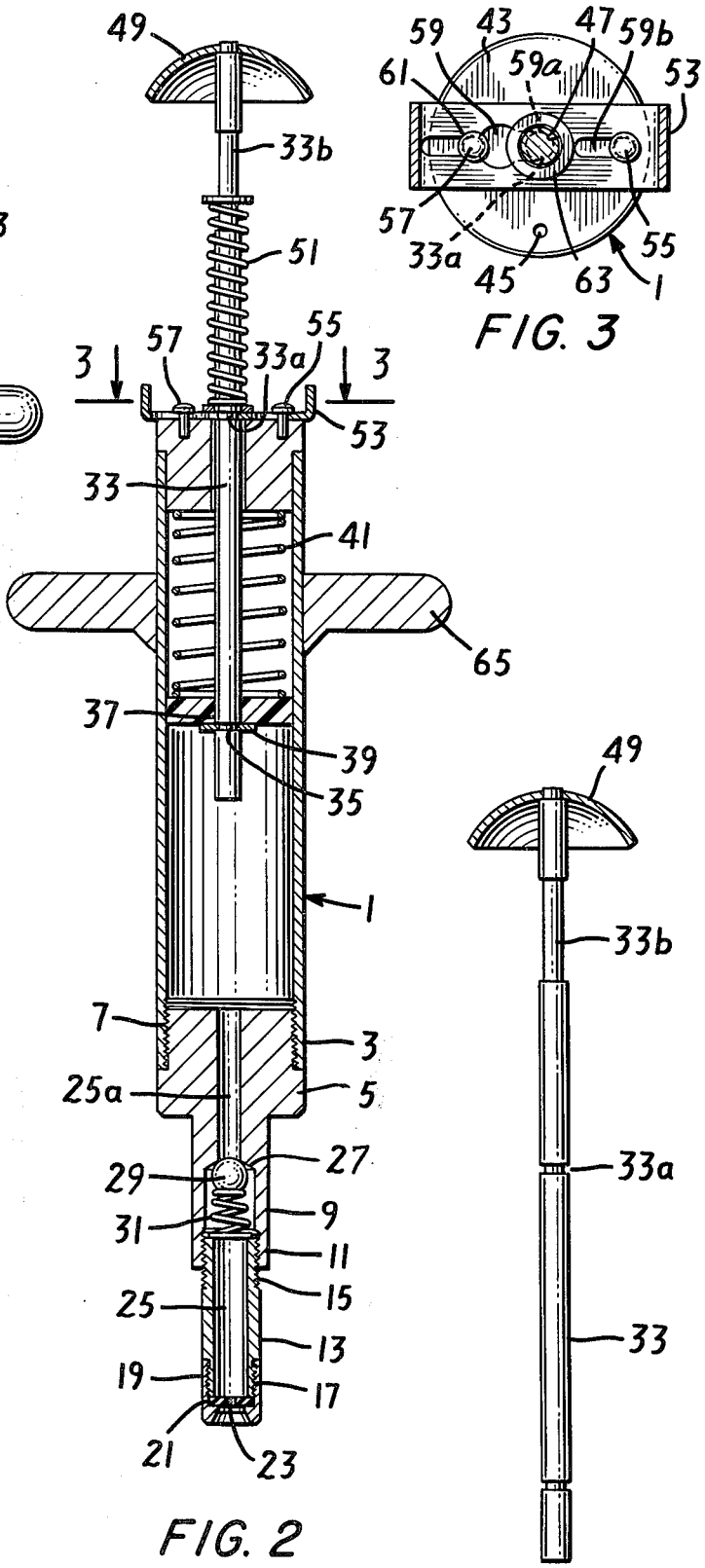
FIG. 2 is a longitudinal sectional view of the grease gun shown in FIG. 1 illustrating the novel and unique features of the invention.
FIG. 3 is a sectional view taken along the line 3—3 of FIG. 2.

Referring now to the drawings, and particularly to FIGS. 1 and 2, there is shown a hollow cylindrical body 1 which may be preferably made from a seamless, light weight metal tubing such as aluminum. The cylindrical body 1 is internally threaded at its front end as in 3.

A removable delivery nozzle (as shown in the lower section of FIG. 1), comprising a knurled flange 5 and an externally threaded portion 7 is adapted to be screwed into the front end 3 of the cylindrical body 1 such that when the externally threaded portion 7 is completely screwed into the front end 3 of the cylindrical body 1, the knurled flange member 5 provides a tight, leak-proof closure for the cylinder.

A nozzle 9 is integrally formed with the knurled flange 5, and has its front end internally threaded as in 11 for threaded engagement with a tubular fitting 13 having one end externally threaded as in 15 for threaded engagement with the nozzle 9. The tubular fitting 13 is also externally threaded at its front end as in 17 for threaded engagement with a knurled nut 19 which is interiorly recessed at its front end to securely retain a rubber gasket 21 having a central aperture 23 adapted to receive a male grease fitting of the electronic apparatus in order to force the grease therethrough. The knurled nut 19 may be replaced with different size fittings (or tubings) depending on the size of the male connection of the electronic instrument.

A central bore 25 extends through the tubular fitting 13 and the nozzle 9, tapering at 27 and further extending, as a reduced central bore 25a, through the knurled flange 5 and the threaded portion 7 of the removable delivery nozzle 9.

A ball valve 29 is seated against the spring 31 as shown in FIG. 2. The diameter of the ball valve 29 is less than the central bore 25 but larger than the reduced central bore 25a, so as to provide a closure for the central bore 25a. This prevents leakage of the grease from the cylindrical body 1 into the central bore 25 when the gun is filled with grease, and also prevents the backflow of grease from the external grease source into the central bore 25a.

A push rod 33 extends centrally through the cylindrical body 1 and a central aperture 35 of the plunger 37 which is disposed within the cylindrical body 1. The push rod 33 is slidably retained to the plunger 37 by means of a locking ring 39 and is adapted to slide freely through the aperture 35 of the plunger 37. A barrel spring 41 is disposed around a finite length of the push rod 33 and is adapted to be compressed when the push rod 33 is retracted from the cylindrical body 1 as will hereinafter be described in more detail.

The barrel spring 41 bears against the barrel end cap 43 which provides a closure for the cylindrical body 1 at the back end of the grease gun. At its front end, the barrel spring 41 bears against the plunger 37 as shown in FIG. 2. The barrel end cap 43 is provided with a vent hole 45 through which any entrapped air is expelled during the retraction of the push rod 33 when the cylindrical body 1 is being filled with grease.

The barrel end cap 43 is also provided with a central aperture 47 (which is in alignment with the reduced central bore 25a) through which extends the push rod 33 exteriorly of the cylindrical body 1. The push rod 33 is affixed to a push rod handle 49 and is adapted to be depressed thereby during the lubrication operation, and a push rod handle spring 51 serves to return the push rod handle 49 to its normal release position as will become more apparent from the description of the operation of the grease gun.

The grease gun of this invention is equipped with a lock slide lever 53 which is slidably secured to the barrel end cap 43 by means of rivet pins 55 and 57. Lock slide lever 53 has a central aperture 59 (for the passage of the push rod 33) with a laterally reduced portion 59a adapted to engage the push rod 33 in its fully retracted position as will hereinafter be explained, and a rivet pin groove 59b as shown in FIG. 3. A second rivet pin groove 61 is disposed in spaced relation to the said reduced lateral portion 59a.

Figure 4:
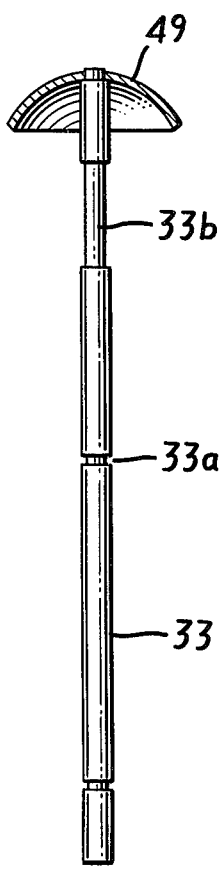
FIG. 4 is a side view of the push rod and push rod handle of the grease gun, as will hereinafter be described.

The push rod 33 comprises a circumferentially recessed groove 33a (see FIG. 4) which engages into the said laterally reduced portion 59a thereby locking the push rod 33 into its fully retracted position. The push rod 33 also comprises an elongated detent portion 33b which engages with the said reduced lateral portion 59a when it is in its normal release position in order to control the stroke of the push rod 33.

In its normal release position, the push rod spring 51 bears against the interior of the push rod handle 49 at one end, and is retained by the washer 63 which is seated on the lock slide lever 53.

The grease gun of this invention is also provided with a grip handle 65 so that the grease gun can be conveniently gripped and operated with one hand.

In operation, the gun is first filled with grease as follows: the nozzle delivery end is removed by unscrewing the threaded portion 7 away from the cylindrical body 1 and inserting the body in the grease source. The push rod 33 is then drawn back by pulling back the push rod handle 49 until the push rod 33 is in its fully retracted position. The lock slide lever 53 is then moved in so as to engage the circumferentially recessed groove 33a into the laterally reduced portion 59a of the central aperture 59. The retraction of the push rod 33 creates a vacuum in the cylindrical body 1, thus causing grease to flow from the external grease source (which is ordinarily under atmospheric pressure) into the cylindrical body 1. Additionally, retraction of the push rod 33 compresses the barrel spring 41, which remains compressed while the push rod 33 is locked in its fully retracted position (see FIG. 2). Also, any air which may be trapped in the cylindrical body 1 (between the barrel end cap 43 and the plunger 37) will be expelled through the vent hole 45 during the retraction of the push rod 33.

After the gun has been filled with grease, the nozzle delivery end is screwed back on by screwing the threaded portion 7 into the threaded end 3 of the cylindrical body 1. The lock slide lever 53 is now moved out to release the push rod 33 (and its associated plunger 37) into its normal release position and the lock slide lever 53 is then moved in to engage the detent portion 33b of the push rod 33 into the laterally reduced portion 59a, thus controlling the stroke of the push rod 33 in its normal release position (see FIG. 1).

When the push rod 33 is returned to its normal release position, the compressive forces on the barrel spring 41 are removed causing it to expand, thus maintaining a positive pressure on the grease in the cylindrical body 1. The gun is now primed and ready for use.

In order to dispense the grease from the grease gun, the said central aperture 23 of the knurled nut 19 is engaged with the male connection of the electronic instrument as aforesaid. The push rod 33 is then depressed by pressing down on the push rod handle 49, thus forcing the grease through the central reduced bore 25a, past the ball valve 29, which is forced against the spring 31, into the central bore 25 and out through the central aperture 23.

While the grease gun of this invention and its operation have been described hereinbefore in detail, and with a certain degree of particularity, it is obvious to those skilled in the art that some modifications may be made in its design and construction which are nevertheless encompassed within the scope and spirit of this invention. It must additionally be noted that unlike the known grease guns of the prior art which are relatively large and bulky, and which are usually employed only for lubricating automobile parts and similar accessories, the grease gun of this invention is relatively small in dimensions (usually about 8 to 10 inches long and 1 to 1 ½ inches in diameter) and is particularly well-suited for lubricating electronic instruments for which most of the prior art grease guns are neither useful nor practical.

What is claimed is:

1. A grease gun comprising, in combination, a hollow cylindrical body closed at one end and having a removable delivery nozzle at the other end, said closed end having a central aperture, and a vent means in spaced relation therewith, a plunger means within said cylindrical body having a central aperture, a rod member slidable through said central aperture of said plunger means, said rod member having retaining means to prevent said plunger means sliding off of said rod, said rod member having a circumferentially recessed groove and an elongated detent portion in spaced relationship with each other, said rod member extending through said central aperture of said closed end of said cylindrical body and terminating exteriorly of said closed end, spring means around said rod member interiorly of said cylindrical body between said closed end and said plunger means adapted to force said plunger means towards said delivery nozzle, a central bore within said removable delivery nozzle, means within said central bore to be biased to permit the one way passage of grease from said cylindrical body through said central bore, a lock slide member slidably secured to said closed end of said cylindrical body, said lock slide member having a central aperture for passage of said rod member with a laterally reduced extension adapted to engage with said circumferentially recessed groove of said rod member when said rod member is withdrawn to said groove position, and with said elongated detent portion of said rod member when said rod member is in normal release position with the elongated detent portion controlling the stroke of said rod member.

2. A grease gun comprising, in combination, a hollow cylindrical body closed at one end and having a removable delivery nozzle at the other end, said closed end having a central aperture, and a vent aperture in spaced relation therewith, a plunger within said cylindrical body having a central aperture, a push rod slidably retained by said plunger, said push rod having a circumferentially recessed groove and an elongated detent portion in spaced relationship with each other, said push rod extending through said central aperture in said plunger and through said closed end of said cylindrical body terminating exteriorly thereof, handle means for depressing said push rod, spring means around said push rod exteriorly of said cylindrical body between said handle means and said closed end, a spring around said push rod interiorly of said cylindrical body between said plunger and said closed end and adapted to force said plunger towards said delivery nozzle, a central bore with a reduced hollow extension within said removable delivery nozzle, a spring within said central bore, a ball valve seated against said spring and adapted to be depressed against said spring to permit the passage of grease from said cylindrical body and said reduced hollow extension into said central bore, means in said removable delivery nozzle for engagement with an external source for lubrication, a lock slide lever slidably secured to said closed end of said cylindrical body, said lock slide lever having a central aperture for passage of said rod member with a laterally reduced extension adapted to engage with said circumferentially recessed groove of said push rod when said push rod is withdrawn to said groove, and with said elongated detent portion of said push rod when said push rod is in normal release position with the elongated detent portion controlling the stroke of said rod member.